United States Patent
Weiss et al.

(10) Patent No.: US 10,301,535 B2
(45) Date of Patent: May 28, 2019

(54) FOLDED OR CRUMPLED PROPPANTS WITH INCREASED MATERIAL STRENGTH FOR HYDRAULIC FRACTURING, GRAVEL PACKING AND FRAC PACKING

(71) Applicant: BAKER HUGHES INCORPORATED, Houston, TX (US)

(72) Inventors: Stephanie A. Weiss, The Woodlands, TX (US); Naima Bestaoui-Spurr, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 141 days.

(21) Appl. No.: 15/440,900

(22) Filed: Feb. 23, 2017

(65) Prior Publication Data
US 2017/0158953 A1 Jun. 8, 2017

Related U.S. Application Data

(62) Division of application No. 14/258,457, filed on Apr. 22, 2014, now Pat. No. 9,676,993.

(51) Int. Cl.
*C09K 8/80* (2006.01)
*E21B 43/267* (2006.01)
(Continued)

(52) U.S. Cl.
CPC .................. *C09K 8/80* (2013.01); *C09K 8/62* (2013.01); *E21B 43/04* (2013.01); *E21B 43/26* (2013.01);
(Continued)

(58) Field of Classification Search
CPC ........ C09K 8/62; C09K 8/80; C09K 2208/10; C09K 2208/30; E21B 43/04; E21B 43/26; E21B 43/267
See application file for complete search history.

(56) References Cited

U.S. PATENT DOCUMENTS

| | | |
|---|---|---|
| 1,464,604 A | 8/1923 | Hall |
| 2013/0004798 A1 | 1/2013 | Huang |

(Continued)

OTHER PUBLICATIONS

Cambou, Anne Dominique et al., "Three-dimensional structure of a sheet crumpled into a ball," Nat'l Academy of Science, vol. 108, No. 33 (Aug. 23, 2011).

(Continued)

*Primary Examiner* — Frances Tischler
(74) *Attorney, Agent, or Firm* — Mossman, Kumar & Tyler, P.C.

(57) ABSTRACT

Relatively low strength and/or relatively low density, but ductile materials may be folded or crumpled and finely divided to give proppants for introduction into hydraulic fractures, where the folded or crumpled structure of the proppants gives relatively increased strength relative to the relatively low strength and/or relatively low density of the materials. Materials not previously considered suitable for proppants may be considered when structure or configured in this manner. Similarly to the case where crumpled paper within a cardboard box keeps it from collapsing, the folded or crumpled material spontaneously develops structural rigidity at relatively low volume fractions without a specific externally imposed design. The folded or crumpled proppants may also be used alone or together with conventional proppants for sand control in gravel packs or frac packs.

13 Claims, 1 Drawing Sheet

(51) Int. Cl.
　　　 *E21B 43/04* 　　　(2006.01)
　　　 *C09K 8/62* 　　　 (2006.01)
　　　 *E21B 43/26* 　　　(2006.01)

(52) U.S. Cl.
　　　 CPC ........ *E21B 43/267* (2013.01); *C09K 2208/10* (2013.01); *C09K 2208/30* (2013.01)

(56) References Cited

U.S. PATENT DOCUMENTS

2014/0110110 A1* 4/2014 Rohring .................. C09K 8/80
　　　　　　　　　　　　　　　　　　　　　　　166/280.2
2015/0299559 A1 　10/2015 Weiss et al.

OTHER PUBLICATIONS

O. Bouaziz, J.P. Masse, S. Allain, L. Orgeas, P. Latil, "Compression of crumpled aluminum thin foils and comparison with other cellular materials", Materials Science and Engineering: A, vol. 570, May 15, 2013, pp. 1-7.

* cited by examiner

FOLDED OR CRUMPLED PROPPANTS WITH INCREASED MATERIAL STRENGTH FOR HYDRAULIC FRACTURING, GRAVEL PACKING AND FRAC PACKING

CROSS-REFERENCE TO RELATED APPLICATION

This invention is a divisional application of U.S. Ser. No. 14/258,457 filed Apr. 22, 2014, now issued Jun. 13, 2017 as U.S. Pat. No. 9,676,993, incorporated herein by reference in its entirety.

TECHNICAL FIELD

The invention relates to methods of making and compositions for proppants for introduction into the hydraulic fractures of a subterranean formation and sand control methods, such as gravel packing and frac pack and more particularly relates to methods of making and compositions for proppants which permit the proppants to be made of relatively low-strength and/or low-density materials but which may still give a proppant of comparable strength to conventional proppants.

TECHNICAL BACKGROUND

Hydraulic fracturing is a common stimulation technique used to enhance the production of hydrocarbon fluids from subterranean formations. In a typical hydraulic fracturing treatment, fracturing treatment fluid containing a solid proppant material is injected into the formation at a pressure sufficiently high enough to cause the formation to fracture or cause enlargement of natural fractures already present in the reservoir. The fracturing fluid that contains the proppant or propping agent typically has its viscosity increased by a gelling agent such as a polymer, which may be uncrosslinked (linear) or crosslinked, and/or a viscoelastic surfactant. During a typical fracturing treatment, propping agents or proppant materials are deposited in a fracture, where they remain after the treatment is completed. After deposition, the proppant materials serve to hold the fracture open, thereby enhancing the ability of fluids to migrate from the formation to the well bore through the fracture. Because fractured well productivity depends on the ability of a fracture to conduct fluids from a formation to a wellbore, fracture conductivity is an important parameter in determining the degree of success of a hydraulic fracturing treatment and the choice of proppant may be critical to the success of stimulation.

Because the proppants must hold the fracture open, traditional proppants are made from very strong and/or crush-resistant materials. Suitable traditional proppants include, but are not necessarily limited to, white sand, brown sand, ceramic beads, glass beads, bauxite grains, sintered bauxite, sized calcium carbonate, walnut shell fragments, aluminum pellets, nylon pellets, nuts shells, gravel, resinous particles, alumina, minerals, polymeric particles, and combinations thereof. It will be appreciated that since relatively large amounts of proppants are often used in a proppant stage that it is important to consider ways of reducing the cost of proppants.

Proppant-like deformable particles have also been used in conjunction with proppants for various purposes, for instance, in order to minimize proppant flow back problems.

Proppant has also been used for gravel pack operations. Gravel packing is a sand-control method employed to prevent the production of formation sand. Gravel packing treatments are used to reduce the migration of unconsolidated formation particulates into the wellbore. Typically, gravel pack operations involve placing a gravel pack screen in the wellbore and packing the surrounding annulus between the screen and the wellbore with gravel designed to prevent the passage of formation sands through the pack. The gravel pack screen is generally a type of filter assembly used to support and retain the gravel placed during the gravel pack operation. Particulates known in the art as gravel are carried to a wellbore by a hydrocarbon- or aqueous-based carrier fluid, including viscosified or brine-based systems. The carrier fluid leaks off into the subterranean zone and/or is returned to the surface while the particulates are left in the zone. The resultant gravel pack acts as a filter to separate formation sands from produced fluids while permitting the produced fluids to flow into the wellbore.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

It would be desirable to provide a method and material for proppants that give choices of less expensive and/or alternate materials which may nevertheless be suitable for proppants. It would also be desirable to provide proppants of relatively low density and/or low specific gravity.

SUMMARY

There is provided in one non-limiting embodiment a proppant comprising at least one crumpled layer having outer perimeter defining a proppant volume, and at least one interstice within the proppant volume adjacent the layer.

There is additionally provided in one non-restrictive version, a method of making a proppant comprising providing a layer, and not necessarily in this order: crumpling the layer and finely dividing the layer. The method produces a proppant comprising at least one crumpled layer having outer perimeter defining a proppant volume, and at least one interstice within the proppant volume adjacent the layer.

Further there is provided in a different non-restrictive embodiment a method of fracturing a subterranean formation comprising introducing a proppant stage into the subterranean formation, wherein the proppant stage comprises a carrier fluid and a proppant. The carrier fluid may include, but not necessarily be limited to, brine, slickwater, an aqueous fluid gelled with a linear gel, an aqueous fluid gelled with a crosslinked gel, an aqueous fluid gelled with a viscoelastic surfactant, a fluid containing a gas (e.g. carbon dioxide and/or nitrogen), and mixtures thereof. The proppant comprises at least one crumpled layer having outer perimeter defining a proppant volume, and at least one interstice within the proppant volume adjacent the surface.

Figure 1:
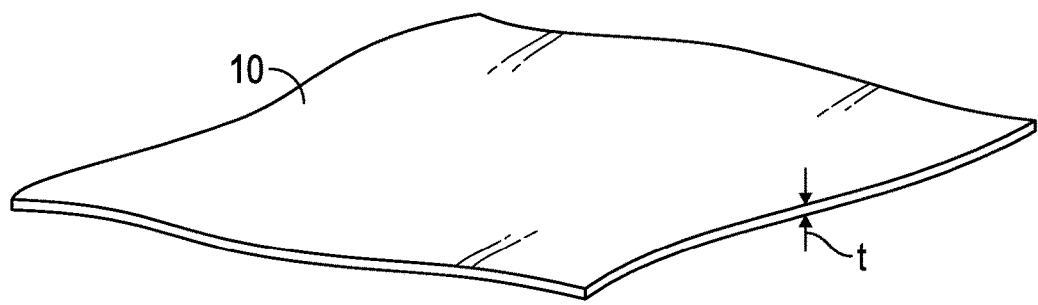
FIG. 1 is a schematic illustration of a relatively flat layer of relatively ductile proppant material.

It will be appreciated that the various Figures are not necessarily to scale and that certain features have been exaggerated for clarity and do not necessarily limit the features of the invention.

DETAILED DESCRIPTION

Conventional materials used for propping open fractures created in subterranean formations during oilfield operations have inherently high strength, but also usually have high density. In contrast, low-density proppant is easier to transport into a fracture. It has been discovered that relatively low-strength (and low density) but ductile materials may have their strength increased through folding or crumpling the material, which provides added strength in three dimensions, similar to the principle of using crumpled paper to keep a box from collapsing during shipping. This same principle should enable the use of materials never considered previously for proppants because of their low inherent strength. See, for instance, A. D. Cambou, et al., "Three-Dimensional Structure of a Sheet Crumpled into a Ball," *Proceedings of the National Academy of Science*, Vol. 108, No. 33, Aug. 23, 2011, pp. 1-5, incorporated herein by reference in its entirety.

Ultra lightweight proppants are easier to transport down a long horizontal well section and deep into a fracture, but are more difficult to manufacture than natural sand, ceramic or bauxite proppants that can withstand the closure stresses required to hold open the fracture. Most considerations of new materials for ultra lightweight proppants consider only materials with inherent high strength. The conventional thinking is that porosity or voids within proppants particles will weaken the material. The proppants described herein are different. These proppants rely on voids and porosity to maintain the material density as the ductile material folds or crumples itself into a multi-walled structure that exhibits 2 to 5 times the strength of a single layer of the same material. This ideally enables the use of materials previously considered too weak to support downhole closure stresses.

It is expected that the proppants described herein may be made in a variety of ways. In one non-limiting embodiment, the proppant material is sprayed using an atomizer, including, but not necessarily limited to, a nebulizer or other device to form a thin layer from a fine mist, spray, fog or aerosol, which layer is then exposed to quick heating for dehydration thus crumpling the layer. The resulting granules are then compacted, folded or crumpled to obtain the most benefits within the parameters described herein. Optionally, the resulting material may be coated with a resin. In another optional embodiment, the resulting material may be sintered at high temperature. In order to keep the porosity high, the material may be put in a furnace at relatively high temperature and then cooled very quickly. "High temperature" is defined herein as from about 800 to about 1500° C. If the layer is not flexible enough then a polymer such as carboxymethyl cellulose (CMC), epoxy, guar, and the like could be added.

In another non-limiting embodiment, a very thin layer of material having a relatively large area may be crumpled and or folded and then finely divided by chopping, granulating, grinding, cutting, comminuting or other size reduction method. The very thin layer may be a bilayer (or multiple layers) of two materials that expand or contract at different rates when subjected to heating or cooling cycles, respectively, or both, where the different rates cause the bilayer (or multiple layers) to fold, buckle or crumple. The sequence could also be reversed. That is, a very thin layer of material having a relatively large area may be finely divided by chopping, granulating, grinding, cutting or other size reduction, and then the tiny pieces could be crumpled and or folded, such as by the techniques described herein, or additionally rolled, pressed, compacted or otherwise formed into relatively uniformly size particles of roughly spherical shape. It will be appreciated, however, that shapes other than spheres may be suitable for the proppants described herein, including, but not necessarily limited to, beaded, cubic, bar-shaped, cylindrical, elongated, or a mixture thereof.

In a different non-restrictive version, the technology used to make hollow microcapsules, such as used in pharmaceutical and other agent delivery, could be used to make hollow, tiny spheres, which would then be crumpled and/or folded to make the proppants. Unlike for some uses, the microcapsules would not necessarily have to be air tight—that is, they could have voids or holes—and it would not matter if the spherical layer or shell was broken in the crumpling or folding. Indeed, the goal of making relatively perfect microcapsules for most such applications would not be needed to make the proppants described herein.

Indeed, what is important in all of these embodiments is to spontaneously create proppant particles that develop structural rigidity at very low volume fractions without externally imposed design, except for forming the volume or outer dimensions of the proppants. This rigidity has been attributed to the formation of ridges with high buckling strengths, again as in the case where crumpled paper keeps a cardboard box from collapsing, protecting the contents of an objected packed with crumpled paper inside the box.

Suitable materials for the proppants herein include, but are not necessarily limited to, ceramics, carbon materials, metals, polymers, and combinations thereof. Suitable ceramic materials include but are not necessarily limited to, oxide-based ceramics, nitride-based ceramics, carbide-based ceramics, boride-based ceramics, silicide-based ceramics, or a combination thereof. In a non-limiting embodiment, the oxide-based ceramic may include, but is not necessarily limited to, silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic may contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include, but are not necessarily limited to, zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Suitable carbon materials include, but are not necessarily limited to, carbon nanotubes, graphene and its oxide, graphite, and combinations thereof. Suitable metals include, but are not necessarily limited to, titanium, aluminum, and alloys thereof and combinations thereof. Suitable polymer include, but are not necessarily limited to, carboxymethyl cellulose (CMC), polyethylene terephthalate, polyimides, polypropylene, polyethylene, polycarbonate, polyurethane, and combinations thereof. In short, any material that can form a sheet or layer, and which will crumple under dehydration and/or be formed by folding or other force and be sufficiently strong after being formed into crumpled particles will work.

As schematically shown in FIG. 1, the sheet or layer 10 described previously may have a thickness, t, between about 1 mm independently to about 5 microns; alternatively from about 30 microns independently to about 10 microns. As used herein with respect to a range, the term "independently" means that any lower threshold given may be combined with any upper threshold given to provide a suitable alternative range. It will be appreciated that the layer, sheet or shell 10 need not necessarily be perfectly smooth, or even necessarily uniformly thick. Layer or sheet 10 may be textured in one or more ways including, but not necessarily limited to, ridged, dimpled, scored, stippled, waved, crosshatched, and the like and combinations of these as long such texture does not interfere with the goal of providing crumpled or folded proppants of suitable strength. Indeed, it is expected that some of these textures will enhance the strength of the folded or crumpled proppants.

Figure 2:
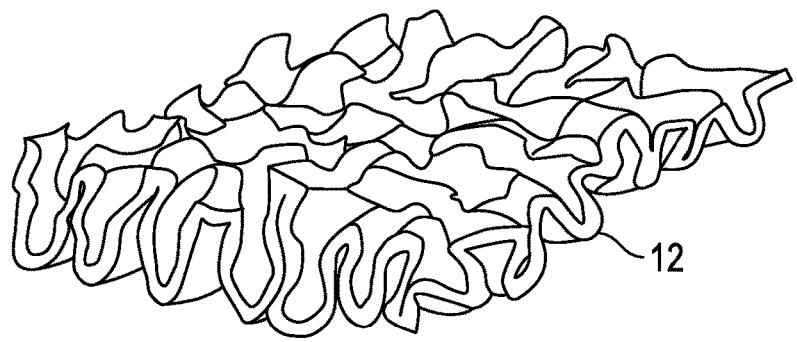
FIG. 2 is a schematic illustration of the relatively flat layer of relatively ductile proppant material of FIG. 1 after it has been crumpled.
Figure 3:
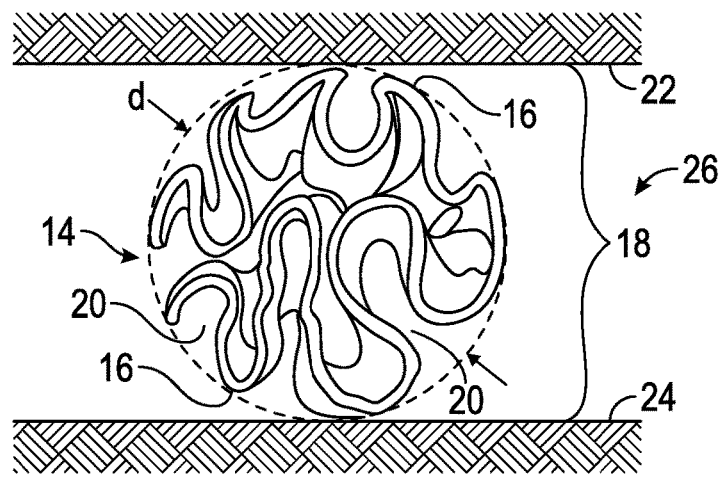
FIG. 3 is a schematic illustration of a single proppant particle formed from a crumpled relatively ductile proppant material, formed into a particle and placed within a fracture.

Schematically illustrated in FIG. 2 is a folded or crumpled layer or sheet 12, such as what may result from crumpling or folding entire sheet or layer 10 of FIG. 1. When crumpled layer or sheet 12 is finely divided and optionally shaped, a proppant particle 14 results as schematically illustrated in FIG. 3. Proppant particle 14 includes at least one crumpled layer 16 having outer perimeter defining a proppant volume 18, and at least one interstice 20 within the proppant volume 18 adjacent the layer 16. It will be appreciated that even if a single sheet or layer 10 is used to make proppant particles 14 that in the process of comminuting or reducing the size and shape of the single sheet or layer 10 to give the proppant particles 14 that various of the proppant particles 14 may in fact be composed of two or more layers 16 that are compressed together.

It will be appreciated that although proppant particles 14 will likely define or configured as a roughly spherical shape or volume 18, such as that shown in FIG. 3, that as with conventional proppants, other shapes may be acceptable or desired. Such suitable shapes may include, but are not necessarily limited to, spheres, spheroid, ellipsoid, beaded, cubic, bar-shaped, cylindrical, or combinations or mixtures thereof. As is well known spherical or spheroid shapes are the most common shapes in the industry, and the industry has had long experience with these shapes, so it should be expected that spheroid shapes would be accepted and commonly used. However, in some non-limiting instances, such as partial monolayer applications, other shapes besides spheres may be acceptable. In the case of a generally spherically shaped proppant particle 14 such as that shown in FIG. 3, it will be appreciated that the volume 18 may be calculated from the diameter, d, using the formula $V=(4/3)\pi r^3$, where V is the volume and r is the radius, which of course is simply d/2.

It will further be appreciated that the proppant particles 14 will likely have a plurality of interstices 20 adjacent to the layers 16. Again, it will be appreciated that the crumpled state of the proppant particles 14 spontaneously develops structural rigidity at very low volume fractions without externally imposed design, except for forming the volume 18 or outer dimensions of the proppants 14. This rigidity has been attributed to the formation of ridges with high buckling strengths, again as in the case where crumpled paper keeps a cardboard box from collapsing, protecting the contents of an objected packed with crumpled paper inside the box, although in this case, the proppants 14 resist the upper fracture face 22 from collapsing onto the lower fracture face 24, as seen in FIG. 3. Upper fracture face 22 and lower fracture face 24 define two boundaries of fracture 26. The folded and crumpled structures of proppant particles 14 permit the use of relative low-strength and/or relatively low-density, but ductile materials to be used, yet the proppant particles 14 may have the equivalent strength of conventional proppants. In one non-limiting embodiment the proppant particles 14 may be able to withstand pressures ranging from about 1,000 independently to about 10,000 psi (about 6.9 to about 69 MPa); alternatively from about 2000 independently to about 5000 psi (about 13.8 to about 34.5 MPa). It is thus appreciated that the "strength" discussed herein is compressive strength.

Proppant particles 14 may have an average particle size of from about 125 independently to about 1700 microns. Common ranges for proppant and fines control methods including frac packing and gravel packing include, but are not necessarily limited to, 12/18 mesh (about 1680 independently to about 1000 microns); 20/40 mesh (about 841 independently to about 400 microns); 30/50 mesh (about 595 independently to about 297 microns); 40/70 mesh (about 400 independently to about 210 microns); 100 mesh (149 microns) and in some instances below about 100 mesh (149 microns) as needed for certain applications.

It should be understood that the folded or crumpled proppants described herein will find a wide variety of uses including, but not necessarily limited to, proppant packs, and in sand control structures including, but not necessarily limited to, gravel packs, frac packs and combinations thereof. Such packs may include only the folded or crumpled proppants, or may include a mixture or combination of folded or crumpled proppants along with conventional, solid proppants. These packs and structures will inhibit, prevent or otherwise control the unwanted production of sand.

It will be appreciated that due to the relatively large number of interstices 20 and the total volume of interstices 20 in a volume 18 of the proppant particles 10 that the density of the proppant particles 10 will be relatively low, in a non-limiting instance below about 2.4 g/cc, and alternatively below about 2 g/cc. The interstices 20 will also aid in the proppants 10 having greater porosity than conventional proppants that are solid, thereby increasing conductivity through the proppant pack. It should also be appreciated that the porosity or proportion of voids within proppants 14 will depend on the exact materials and exact processes used to make them. Traditional or conventional proppants are defined herein in one non-limiting embodiment as proppants that are solid, and in another non-restrictive version as solid proppants having an absence of an interstice.

In another non-limiting embodiment, the proppant particles herein may be a relatively lightweight or substantially neutrally buoyant particulate material or a mixture thereof. By "relatively lightweight" it is meant that the solid particulate has an apparent specific gravity (ASG) or density which is less than or equal to 2.45, including those ultra lightweight materials having an ASG less than or equal to 2.25, alternatively less than or equal to 2.0, in a different non-limiting embodiment less than or equal to 1.75, and in another non-restrictive version less than or equal to 1.25 and often less than or equal to 1.05.

It is expected that the same placement method known to be used in the art for ultra lightweight (ULW) proppants may be used for the placement of the proppants described herein into the subterranean formation. For example, a proppant stage may be introduced into a subterranean formation using a carrier fluid and the proppants described herein, where suitable carrier fluids include, but are not necessarily limited to, brine, slickwater, an aqueous fluid gelled with a linear gel, an aqueous fluid gelled with a crosslinked gel, an aqueous fluid gelled with a viscoelastic surfactant, and mixtures thereof, and other types of delivery systems including but not necessarily limited to those with using a gas, including, but not necessarily limited to nitrogen and/or carbon dioxide ($CO_2$). Suitable proppant loadings in the proppant placement methods herein include, but are not necessarily limited to about 0.1 independently to about 12 lbs per gallon (about 0.01 independently to about 1.4 kg/liter), alternatively from about 1 independently to about 10 lbs per gallon (about 0.1 independently to about 1.2 kg/liter).

It is also expected that in some non-limiting embodiments that the proppants described herein may be used to minimize proppant flow back problems. Undesirable proppant flow back occurs when proppant is flowed back along with production fluids (e.g. oil and/or gas). If sufficient proppant flows back, then there may not be enough proppant within the fracture to hold the fracture open to increase permeability and improve fluid production. In one non-restrictive version, in a comparison of otherwise identical methods of fracturing a subterranean formation forming a proppant pack within a fracture of the proppants described herein and forming a proppant pack using solid proppants of substantially the same shape as those of the proppants described herein, less proppant is flowed back using the proppants described herein than with the solid proppants. In another non-limiting embodiment, the amount of proppants flowed back is reduced from about 10 wt % or more proppant produced to about 100 wt %, comparing the proppants to a method otherwise identical except that the proppants are solids of substantially the same shape.

It will also be appreciated that the folded or crumpled proppants described herein may be mixed with conventional or traditional proppants such as solid proppants. Such mixtures may be used in fracture proppant packs for improved (reduced) proppant flowback control. In the instance of proppant flowback control, it is anticipated that in some non-limiting embodiments a mixture of shapes (e.g. spherical with elongated, cylindrical, cubic, beaded, bar-shaped and the like and mixtures thereof) and/or as well as types (e.g. folded or crumpled proppants mixed with conventional proppants) will be effective in reducing, inhibiting or preventing proppant flowback. Flowback control will depend to some extent upon the flexibility of the proppant materials used. In one non-limiting embodiment, it will be understood that the crumpled or folded proppants are relatively more deformable than conventional solid proppants. In a further non-restrictive version, when the deformable crumpled or folded proppants are mixed with conventional solid proppants, the proportion of deformable crumpled proppants are less than about 25 wt % of the total amount of proppants, and alternatively less than about 15 wt % of the total mass of proppants.

Additives, such as fillers, plasticizers, and rheology modifiers may be used in the proppant materials described herein in order to achieve desired economical, physical, and chemical properties of the proppant materials during the mixing of the chemical components and forming of the particles, and the field performance of the proppants.

Compatible fillers include, but are not necessarily limited to, waste materials such as silica sand, Kevlar fibers, fly ash, sludges, slags, waste paper, rice husks, saw dust, and the like, volcanic aggregates, such as expanded perlite, pumice, scoria, obsidian, and the like, minerals, such as diatomaceous earth, mica, borosilicates, clays, metal oxides, metal fluorides, and the like, plant and animal remains, such as sea shells, coral, hemp fibers, and the like, manufactured fillers, such as silica, mineral fibers and mats, chopped or woven fiberglass, metal wools, turnings, shavings, wollastonite, nanoclays, carbon nanotubes, carbon fibers and nanofibers, graphene oxide, or graphite.

It will be appreciated that the descriptions above with respect to particular embodiments above are not intended to limit the invention in any way, but which are simply to further highlight or illustrate the invention.

In the foregoing specification, it is to be understood that the invention is not limited to the exact details of procedures, operation, exact materials, or embodiments shown and described, as modifications and equivalents will be apparent to one skilled in the art. Accordingly, the specification is to be regarded in an illustrative rather than a restrictive sense. For example, specific combinations of proppant materials, coatings, additives, and folding, crumpling, and/or size reduction processes to form the proppant particles, reaction conditions to form the proppant particles, hydraulic fracturing method steps, and the like, falling within the claimed parameters, but not specifically identified or tried in a particular method, are anticipated to be within the scope of this invention.

The words "comprising" and "comprises" as used throughout the claims are to be interpreted as "including but not limited to" and "includes but not limited to", respectively.

The present invention may suitably comprise, consist of or consist essentially of the elements disclosed and may be practiced in the absence of an element not disclosed. For instance, the proppant may consist essentially of or consist of at least one crumpled layer having outer perimeter defining a proppant volume and at least one interstice within the proppant volume adjacent the layer.

There may be further provided a method of making a proppant consisting essentially of or consisting of providing a layer, and then not necessarily in this order: crumpling the layer and finely dividing the layer to produce a proppant comprising, consisting essentially of or consisting of at least one crumpled layer having outer perimeter defining a proppant volume and at least one interstice within the proppant volume adjacent the layer.

Further there may be further provided a method of fracturing a subterranean formation comprising, consisting essentially of or consisting of introducing a proppant stage into the subterranean formation, wherein the proppant stage comprises, consists essentially of or consists of a carrier fluid and a proppant, where the carrier fluid is selected from the group consisting of brine, slickwater, an aqueous fluid gelled with a linear gel, an aqueous fluid gelled with a crosslinked gel, an aqueous fluid gelled with a viscoelastic surfactant, or delivered with a gas such as carbon dioxide and/or nitrogen, and mixtures thereof; and the proppant comprises, consists essentially of or consists of at least one crumpled layer having outer perimeter defining a proppant volume and at least one interstice within the proppant volume adjacent the layer.

What is claimed is:

1. A method of placing proppant in a subterranean formation comprising introducing a proppant stage into the subterranean formation, wherein the proppant stage comprises:
- a proppant comprising:
  - at least one folded layer having outer perimeter defining a proppant volume, and where the at least one folded layer comprises a material selected from the group consisting of:
    - a ceramic is selected from the group consisting of aluminosilicate, zirconia, metal carbides;
    - a carbon material is selected from the group consisting of carbon nanotubes, graphene and its oxide, graphite;
    - a metal is selected from the group consisting of aluminum, titanium;
    - a polymer is selected from the group consisting of carboxymethyl cellulose (CMC), polyethylene terephthalate, polyimides, polyethylene, polypropylene, polycarbonate, polyurethane; and combinations thereof, and
  - at least one interstice within the proppant volume adjacent the layer.

2. The method of claim 1 where the proppant stage additionally comprises a carrier fluid selected from the group consisting of brine, slickwater, an aqueous fluid gelled with a linear gel, an aqueous fluid gelled with a crosslinked gel, an aqueous fluid gelled with a viscoelastic surfactant, a carrier fluid containing a gas, and mixtures thereof.

3. The method of claim 1, where in the proppant the layer has a thickness ranging from about 1 mm to about 5 microns.

4. The method of claim 1 where the proppant has an average particle size of from about 125 to about 1700 microns.

5. The method of claim 1, where the proppant has a strength of from about 1,000 to about 10,000 psi (about 6.9 to about 69 MPa).

6. The method of claim 1, where the proppant has a density less than about 2.45 g/cc.

7. A method of placing proppant in a subterranean formation comprising:
- introducing a proppant stage into the subterranean formation, wherein the proppant stage comprises:
  - a proppant comprising:
    - at least one folded layer having outer perimeter defining a proppant volume, the layer comprising a material selected from the group consisting of:
      - a ceramic is selected from the group consisting of aluminosilicate, zirconia, metal carbides;
      - a carbon material is selected from the group consisting of carbon nanotubes, graphene and its oxide, graphite;
      - a metal is selected from the group consisting of aluminum, titanium;
      - a polymer is selected from the group consisting of carboxymethyl cellulose (CMC), polyethylene terephthalate, polyimides, polyethylene, polypropylene, polycarbonate, polyurethane; and combinations thereof,
    - at least one interstice within the proppant volume adjacent the layer, and
    - an average particle size of from about 125 to about 1700 microns.

8. The method of claim 7 where the proppant stage additionally comprises a carrier fluid selected from the group consisting of brine, slickwater, an aqueous fluid gelled with a linear gel, an aqueous fluid gelled with a crosslinked gel, an aqueous fluid gelled with a viscoelastic surfactant, a carrier fluid containing a gas, and mixtures thereof.

9. The method of claim 7, where in the proppant the layer has a thickness ranging from about 1 mm to about 5 microns.

10. The method of claim 7, where the proppant has a strength of from about 1,000 to about 10,000 psi (about 6.9 to about 69 MPa).

11. The method of claim 7, where the proppant has a density less than about 2.45 g/cc.

12. A method of placing proppant in a subterranean formation comprising:
- introducing a proppant stage into the subterranean formation, wherein the proppant stage comprises:
  - a proppant comprising:
    - at least one folded layer having outer perimeter defining a proppant volume, the layer comprising a material selected from the group consisting of:
      - a ceramic is selected from the group consisting of aluminosilicate, zirconia, metal carbides;
      - a carbon material is selected from the group consisting of carbon nanotubes, graphene and its oxide, graphite;
      - titanium;
      - a polymer is selected from the group consisting of carboxymethyl cellulose (CMC), polyethylene terephthalate, polyimides, polyethylene, polypropylene, polycarbonate, polyurethane; and combinations thereof,
    - at least one interstice within the proppant volume adjacent the layer, and
    - an average particle size of from about 125 to about 1700 microns and a strength of from about 1,000 to about 10,000 psi (about 6.9 to about 69 MPa); and
- flowing fluid back through the proppant pack where the amount of the proppants flowed back is less than the proppants flowed back in a method otherwise identical except that the proppants are solids of substantially the same shape.

13. The method of claim 12 where the proppant stage additionally comprises a carrier fluid selected from the group consisting of brine, slickwater, an aqueous fluid gelled with a linear gel, an aqueous fluid gelled with a crosslinked gel, an aqueous fluid gelled with a viscoelastic surfactant, a carrier fluid containing a gas, and mixtures thereof.

* * * * *